(12) United States Patent
Shie et al.

(10) Patent No.: US 6,352,359 B1
(45) Date of Patent: Mar. 5, 2002

(54) VEHICLE LIGHT ASSEMBLY INCLUDING A DIFFUSER SURFACE STRUCTURE

(75) Inventors: Rick L. Shie, Westlake Village; Jeffrey A. Laine, Redondo Beach; Gajendra D. Savant, Torrance, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/139,377

(22) Filed: Aug. 25, 1998

(51) Int. Cl.[7] .................................................. F21V 5/00
(52) U.S. Cl. ....................... 362/522; 362/331; 362/334; 362/509; 362/521; 362/541
(58) Field of Search ................................ 362/509, 520, 362/521, 522, 309, 331, 333, 334, 541, 268

(56) References Cited

U.S. PATENT DOCUMENTS 4,241,388 A  * 12/1980 Green ......................... 362/268
5,582,474 A    12/1996 Van Order et al. ........... 362/74

OTHER PUBLICATIONS

Shagam, R.N., P.h.D., "Light Shaping Diffusers™ Simplify Aircraft Inspection," *Photonics Spectra*, Nov. 1994.
Dusinberre, B., "Light Shaping Diffusers Enhance Depth–Finder Performance," *Laser Focus World*, Jun. 1995.
Szczesniak, S., & Shie, R., "Machine Vision for Semiconductor Manufacture," *Photonics Spectra*, Nov. 1995.
"Directional Turning Film™", Physical Optics Corporation, 1996, Brochure.
Giancola, S., "Hologrpahic Diffuser Makes Light Work of Screen Tests," *Photonics Spectra*, Aug. 1996.
Laine, J., "Mini Display," *Design News*, Dec. 15, 1997.
"Light Shaping Diffusers® Technical Data Sheet," Physical Optics Corporation, Jul. 1, 1998.
"Light Shaping Diffuser® Transmissive Thin Film Price List," Physical Optics Corporation, May 1, 1998.
"Light Shaping Diffuser® Transmission Kits Price List," Physical Optics Corporation, May 1, 1998.

* cited by examiner

Primary Examiner—Stephen Husar
(74) Attorney, Agent, or Firm—Nilles & Nilles, S.C.

(57) ABSTRACT

A vehicle light assembly includes a lens cover from which light emanates. A light shaping surface microstructure is carried in a portion of the light assembly. The microstructure can be incorporated into many different surfaces of the light assembly such as a surface of the lens cover, a surface of a macro-optical structure on the lens cover, or on a reflective surface of the assembly. The microstructure homogenizes and directs light emanating from the light assembly via reflection or transmission to provide a smooth, continuous pattern of light having a predetermined distribution shape or envelope and a predetermined directionality.

39 Claims, 6 Drawing Sheets

VEHICLE LIGHT ASSEMBLY INCLUDING A DIFFUSER SURFACE STRUCTURE

BACKGROUND OF THE INVENTION

1. Field of the Invention

The present invention relates generally to vehicle lights, and more particularly it relates to vehicle light assemblies that incorporate a diffuser surface structure on a surface of the assembly which homogenizes, shapes and directs light exiting the light assembly.

2. Description of the Related Art

It is well known that automobiles use many different interior and exterior lights and light assemblies for various purposes on the vehicle. Other vehicles such as trucks, boats, motorcycles, bicycles, load carriers, airplanes, construction equipment and essentially any other type of vehicle also utilize many different lights and light assemblies. Most light assemblies utilized on vehicles are crude from an optics standpoint and employ rudimentary designs and constructions for convenience and appearance purposes. These types of lights include vanity mirror lights, license plate lights, dome lights, map reading lights, flood lights, instrument panel lights, displays and instrumentation, as well as other types of convenience illumination systems for vehicles. In contrast, certain vehicle light assemblies including headlamps, turn signals, reflectors, brake lights and taillights are provided for safety purposes as well as for appearance. These more important types of lights employ slightly better technology in material and design but also employ only surprisingly crude optics in their design or construction primarily for aesthetic purposes. Very little thought is given to putting the light emanating from such light assemblies where it is most needed as to maximizing transmission efficiency of the assembly.

Figure 1:
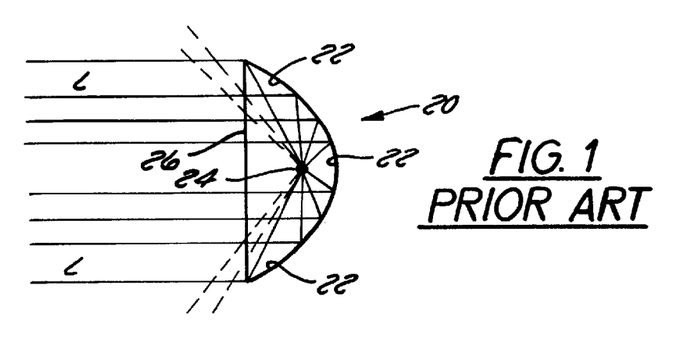
FIG. 1 illustrates a schematic illustration of a known prior art vehicle light assembly construction.

For example, the most important light utilized on nearly all vehicles is the headlight or forward illumination light so the operator can see ahead of the vehicle and so that others can see the vehicle as well. The taillights of vehicles are also important to make the rear of the vehicle visible in the dark to operators of other vehicles. Most of these types of lights employ a parabolic reflector surface disposed behind and partially surrounding a light source such as lamps or bulbs having a filament and LED's. FIG. 1 illustrates a schematic of a typical light assembly such as a headlamp or a portion of a taillamp. The assembly 20 has a parabolic reflective surface 22 and a light source 24 spaced from the surface 22. The lines "L" indicate the directionality of light emanating from the source 24 and the path of light reflected by the reflector surface 20. As illustrated, the light generally passes from the source toward a transparent cover 26 or is reflected by the reflector forward toward the cover in a generally predetermined direction. However, in reality this type of light source has two significant problems which are typically not adequately addressed.

First, the light source 24 has a filament (not shown) that typically does not distribute light evenly. For example, incandescent or halogen bulbs are typically utilized for interior and exterior vehicle lighting systems. Each of these types of bulbs includes a filament housed within an enclosed chamber of the bulb. This chamber is somewhat pressurized where the amount of pressure depends on the type bulb utilized. Halogen bulbs are at a much higher pressure than a standard incandescent bulb. Failure of the bulb usually results from failure of the filament. The filament reacts with gases in the chamber or simply glows by application of energy to the filament to illuminate the bulb. These filaments do not evenly produce light and generate what are known as high intensity regions where more light is directed and low intensity regions where less light is directed. When utilizing a reflection type lighting system, the high and low intensity regions are simply reflected back out from the reflection and remain in the projected light from the assembly. These high intensity and low intensity regions make it difficult for an operator to see objects that the light is intended to illuminate. Such objects may be a map inside a car or may be more importantly a road surface or cars ahead of the vehicle making lane changes or braking. If the light assembly is not a reflection type but merely the type where a bulb or LED directs light from a housing through a lens or cover that spreads the, light the high intensity and low intensity regions are again merely projected as is from the lens.

Secondly, a lot of the light energy or photons are wasted in all different types of automotive or vehicle light assemblies. This is based upon the fact that much of the light leaving a bulb or other light source within the assembly is directed immediately outward from the light source and not directed toward a particular target by either the parabolic reflector surface or by the light source or the lens itself. Any light escaping the light assembly that is not directed toward a particular target is simply wasted. In automotive lighting systems, much of the light from any source is propagated away from the intended direction and wasted. This wasted and misdirected light can cause difficulty in the form of glare for individuals in the general area of the particular vehicle and the light source. "Masking" of a light is sometimes resorted to in order to keep light from emanating in particular directions where it is not desired such as lane changes, lane illumination or braking. This further wastes light energy and adds further complexity to light assemblies.

Figure 2:
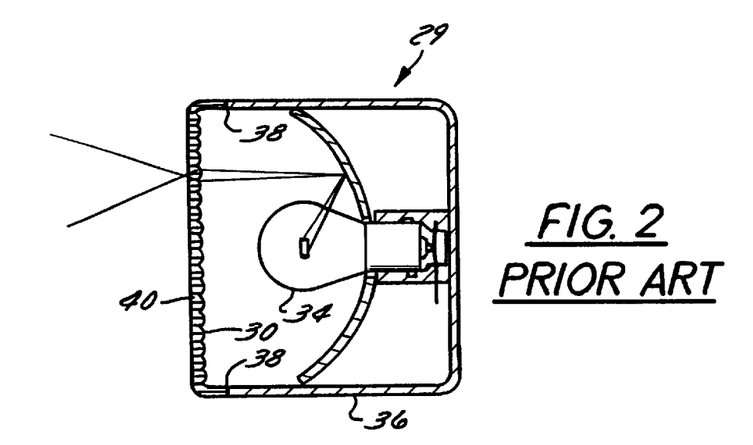
FIG. 2 illustrates one embodiment of a known prior art vehicle light assembly including a lens cover having a plurality of cylindrical dispersion or lens elements.
Figure 3:
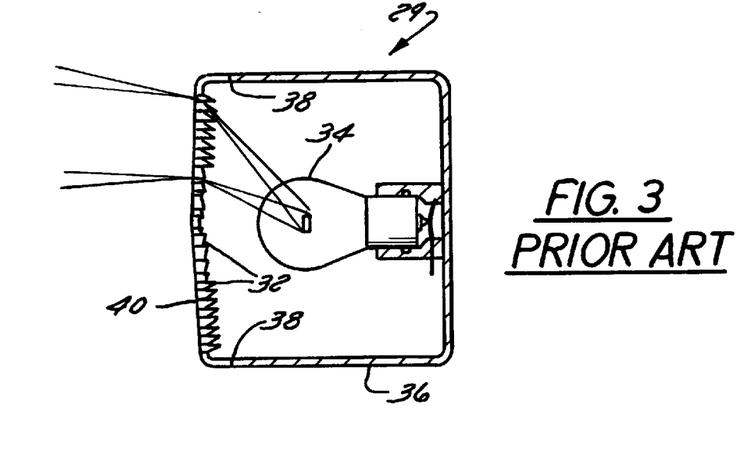
FIG. 3 illustrates one embodiment of a known prior art vehicle light assembly incorporating a lens cover with a plurality of Fresnel optical elements thereon.

Lens covers 26 are sometimes utilized in vehicle light assemblies which have certain lens design or shape characteristics formed therein. These lens characteristics are typically in the form of Fresnel optics, elongate cylindrical lenses, and pillow optics. Each of these types of lenses is intended to spread or otherwise disperse light exiting a light assembly. For example, FIGS. 2 and 3 illustrate very simple schematics of a light assembly utilizing cylindrical dispersion elements 30 (FIG. 2) and Fresnel optics 32 (FIG. 3). These are commonly utilized for vehicle taillamp constructions wherein a bulb 34 is held in a fairly deep and narrow housing 36 illuminating outward through an opening 38. Most taillight assemblies have a number of separate compartments, each one having its own light source and separate or at least distinct cover or lens design. A lens cover or cover section 40 is dispersed over the opening 38 in the housing 36. A Fresnel structure 32 or cylindrical dispersion element structure 30 is incorporated in the lens cover 40 to provide some spread of the light as it exits the housing. Other surface structures such as a prismatic or pillow optic structure are also commonly used. Each of these particular designs is fairly inefficient and does nothing to solve either of the above described problems. In fact, many vehicle light assembly designs are such that, though a lot of light would be lost without such a lens cover, more light may be wasted by utilizing the Fresnel optics or the cylindrical lens construction. This is because the light exiting the housing is further spread by the lens designs. Even more light is wasted where the lens cover is designed to mask light to prevent it from emanating in an undesired direction.

These same problems exist and in fact are enhanced by the more rudimentary designs of the bulbs, housings, reflector surfaces (if present) and lens cover designs for other types of less important vehicle lights such as interior dome lights, map lights, general illumination lights, dash lights, exterior hood and trunk lights, and other vehicle marker lights. Much light is spread to areas beyond a target thus wasting a lot of the light. Additionally, high and low intensity regions are also present for these much simpler designs. The severity of the high and low intensity regions depends upon the type of lens cover placed over the light.

Figure 4A:
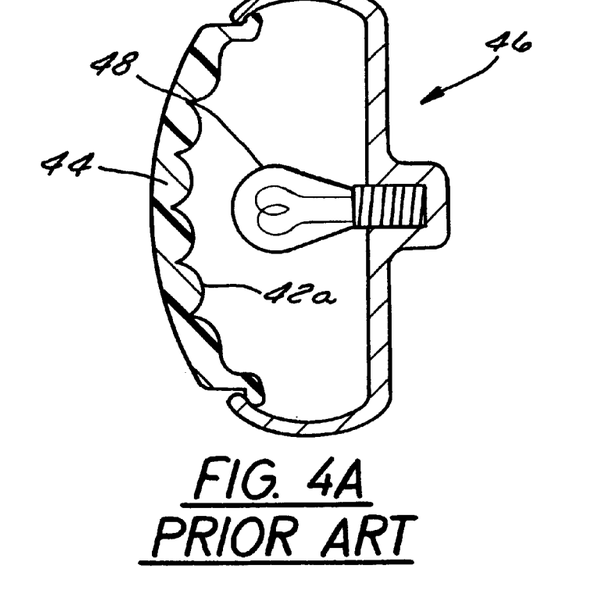
FIGS. 4A–C illustrate partial cross-sections of known prior art vehicle light assemblies incorporating a cover including a plurality of pillow optic formations thereon.
Figure 4B:
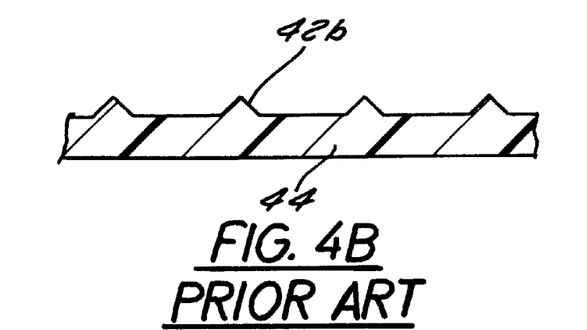
Figure 4C:
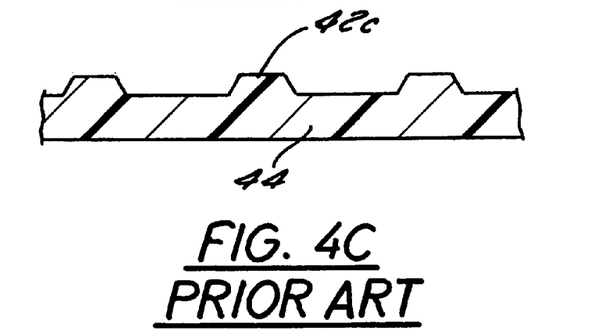

Another element mentioned above and used in the art of vehicle light assembly design is known as "pillow optics," such as are illustrated in FIGS. 4A, 4B and 4C. Pillow optics are relatively large structures 42a, 42b and 42c formed on one surface of a lens cover for a vehicle light assembly 46. The pillow optics 42a–c very inefficiently diffuse light exiting the light source 48 but more importantly are designed merely to enhance the light assembly's and light's aesthetic appearance. The shape, spacing, orientation, size and construction of the pillow optics for a particular light assembly such as for a vehicle taillamp or dome light or map light lend a particular desired appearance to the light assembly. However, the pillow optics provide very little or no real optical characteristics for these light assemblies and usually create further light dispersion and waste which is unnecessary, unwanted and even unsafe for certain types of vehicle light assemblies.

The assignee of the present invention has previously invented highly efficient light diffusing surfaces in the form of a light shaping surface microstructure and methods of forming these surfaces. The novel diffusers produce significantly enhanced homogenization of light dispersed from such a diffusing surface and are capable of directing light with a particular spread, shape, and angle of orientation or directionality. These methods and surface microstructure are described in a number of existing patents and co-pending applications, each commonly assigned to the assignee of the present invention. Each of the below listed patents and applications is incorporated herein by reference for its teachings as to the formation and construction of the diffuser surfaces.

Many of these methods involve creating a master diffuser by exposing a photoresist material to a source of light and then replicating this master diffuser into one or more sub-masters of a more durable nature. There are also other methods of making replicas of a master diffuser which contain the optical features in the master. With some of these methods, the master diffuser is initially created optically. With others, it is created mechanically. Submasters are created from these master diffusers utilizing a number of methods whereby the master diffuser surface is replicated into a submaster surface. These other methods are described in one or more of the below listed co-pending U.S. applications.

Commonly assigned U.S. patents and pending applications disclose related methods for making and recording optical products and replicating those products so that they may be mass produced. For example, U.S. Pat. No. 5,365,354 entitled "Grin Type Diffuser Based on Volume Holographic Material," U.S. Pat. No. 5,534,386 entitled "Homogenizer Formed Using Coherent Light and a Holographic Diffuser," and U.S. Pat. No. 5,609,939 entitled "Viewing Screen Formed Using Coherent Light," all owned by the present assignee relate to methods for recording and replicating optical products. Each of these U.S. patents is incorporated herein by reference for purposes including, but not limited to, indicating the background of the present invention and illustrating the state of the art.

Related U.S. patent applications include U.S. Pat. No. 6,072,511, issued Jun. 6, 2000, entitled "Apparatus for LCD Backlighting," U.S. Pat. No. 6,159,398, issued Dec. 12, 2000, entitled "Method of Making Replicas While Preserving Master," U.S. Pat. No. 5,956,106, issued Sep. 21, 1999, entitled "LCD With Light Source Destructuring and Shaping Device," U.S. Pat. No. 5,858,403, issued Nov. 17, 1998, entitled "Liquid Crystal Display System with Collimated Backlighting and Non-Lambertian Diffusing," U.S. Pat. No. 5,735,988, issued Apr. 7, 1998, entitled "Method of Making Liquid Crystal Display System," U.S. Pat. No. 5,922,238, issued Jul. 13, 1999, entitled "Method of Making Replicas and Compositions for Use Therewith," U.S. Ser. No. 09/137,397, filed Aug. 20, 1998, entitled "Method and Apparatus for Making Optical Masters Using Incoherent Light," pending, U.S. Ser. No. 09/136,995, filed Aug. 20, 1998, entitled "Non-Lambertian Glass Diffuser and Method of Making," pending, U.S. Ser. No. 09/137,398, filed Aug. 20, 1998, entitled "Diffuser Master and Method of Manufacture," pending, U.S. Pat. No. 6,158,245, issued Dec. 12, 2000, entitled "High Efficiency Monolithic Glass Light Shaping Diffuser and Method of Making, " U.S. Ser. No. 09/139,488, filed Aug. 25, 1998, entitled "Optical Element Having an Integral Surface Diffuser," pending, U.S. Pat. No. 6,166,389, issued Dec. 26, 2000, entitled "Apparatus Having a Light Source and a Sol-Gel Monolithic Diffuser," U.S. Ser. No. 09/139,455, filed Aug. 25, 1998, entitled "Passive Matrix Liquid Crystal Display," pending, and U.S. Ser. No. 09/139,444, filed Aug. 25, 1998, entitled "Device Including an Optical Element With a Diffuser," pending. All the above applications are owned by the present assignee and are hereby incorporated by reference for purposes including, but not limited to, indicating the background of the present invention and illustrating the state of the art.

SUMMARY OF THE INVENTION

The present invention is directed to vehicle lights and light assemblies which incorporate an optically improved diffuser micro-sculpted surface structure or microstructure into a surface of a lens or cover of the light assembly.

It is an object of the present invention to provide a vehicle light assembly which has greatly improved optical quality. It is another object of the present invention to provide a vehicle light assembly which has light homogenizing, directing, and shaping capabilities. It is a further object of the present invention to provide a vehicle light assembly which has dramatically improved homogenized light output from the light assembly. It is a further object of the present invention to provide a vehicle light assembly which is capable of directing light only to where it is needed and preventing light from being directed to where it will be wasted. It is a further object of the present invention to provide a vehicle light assembly which will produce less heat. It is another object of the present invention to provide a vehicle light assembly having an output shape distribution corresponding to the area to be illuminated. It is a further object of the present invention to provide a vehicle light assembly which improves many safety characteristics for vehicle lights such as automobiles, trucks and the like.

To accomplish these and other objects of the present invention, in one embodiment a vehicle light assembly has a light source and an at least partially transparent cover disposed over a portion of the light source. The cover has an inner surface adjacent to the light source and another surface facing away from the light source. A light shaping surface microstructure is integrally formed on a surface of the cover. The microstructure provide both a homogenized light output as well as light directing and shaping properties for directing light passing through the cover in a predetermined direction and distribution.

In one embodiment, the cover is molded from a plastic material and the microstructure is integrally molded on one of the surfaces of the cover. In one embodiment the microstructure is molded into the inner surface of the cover.

In one embodiment, the microstructure is combined with a plurality of relatively large pillow optic formations provided on a surface of the cover. The pillow optic formations are of any shape or construction but are provided primarily for aesthetic appearance characteristics. In one embodiment, the microstructure is incorporated directly into the surfaces of the pillow optics. In another embodiment, the microstructure is integrally molded on the surface of the cover opposite the pillow optic formations. Thus, the pillow optic formations and/or the microstructure may be provided on either the inner surface or the outer surface of the cover.

Such a construction can be utilized for virtually any type of vehicle light assembly including headlamps, taillamps, interior dome and map reading lights, interior instrument panel lights, exterior storage compartment lights for the hood or the trunk and for interior storage compartment lights.

In one embodiment, the vehicle light assembly includes a layered covered construction having an exterior cover section covering generally the entire light assembly and an interior layer or cover section having two or more discrete sub-sections, one each covering a separate light source held in compartments within the light assembly. Such a construction is typically utilized for vehicle taillight assemblies wherein the assembly includes several different types of lamps or light sources for different purposes, each held in a separate compartment and covered by a different discrete cover sub-section. In such an embodiment, the microstructure can be included on one or more of the sub-sections of the interior cover layer or on either side or any part or all of the exterior cover layer. The microstructure can therefor homogenize, direct and shape light provided from the appropriate light source, or from a combination of the light sources of the assembly. In any of these embodiments, the microstructure is integrally formed into the surface of the covered material during formation of the cover.

In one embodiment, the vehicle light assembly is a reflector wherein the light source is simply ambient light or light provided from another vehicle's lights. In this particular embodiment a reflective surface may be applied to or placed adjacent a lens cover assembly. Alternatively, the reflection capabilities are provided within the reflector lens itself. The microstructure providing the homogenizing, directing and shaping capabilities can be provided on a surface of the reflector lens and integrally molded therein or may be provided on the separate reflective surface placed behind the reflector lens material.

In one embodiment, the vehicle light assembly includes a light source with a parabolic reflective surface disposed behind the light source for reflecting light emanating form the source outward through an opening of a housing of the assembly. In this embodiment, the microstructure providing the homogenizing, directing and shaping properties is provided directly on the parabolic reflective surface of the light assembly. Light emanating from the source reflects from the reflective surface having the appropriate properties provided by the microstructure.

In one embodiment, the light assembly is a high temperature and high strength headlamp assembly wherein the microstructure is integrally formed in a glass or sol-gel glass cover which is disposed over a light source. Such a light source can be a common halogen headlamp or bulb which generates excessive heat and requires a high temperature resistant material placed adjacent the bulb or any other light source. In such a headlamp construction, the microstructure may be recorded or molded directly into the sol-gel or glass material on either an inner surface or an outer surface or may be integrally formed into a separate second cover layer disposed over the enclosed glass headlamp construction. Alternatively the microstructure may be integral on the parabolic reflective surface of the assembly behind the light source.

In other embodiments, the microstructure may be integrally formed in a surface of a plastic cover such as a dome light or map light cover. The cover is then placed over a simple incandescent bulb light source. The cover may include pillow optic functions or simply be a smooth translucent plastic cover.

In any of these embodiments, the particular size, orientation and shape of the microstructure is designed and selected according to the functional characteristics of a particular vehicle and particular light assembly and function. For example, the microstructure may be designed to homogenize light emanating from a vehicle taillamp assembly as well as control the direction of the light within a particular envelope pattern having a specific vertical and horizontal spread. Critically by employing the microstructure into such a light assembly, virtually all of the light photons emanating from the light source are directed to where they are needed and not wasted in a vertical or horizontal direction as is common with presently known vehicle light assembly designs. The diffuser microstructure can be utilized to shape and homogenize light emanating from virtually any vehicle light assembly whether it be an exterior or interior light and can be designed to homogenize and direct the light as needed for each particular light.

These and other aspects and objects of the present invention will be better appreciated and understood when considered in conjunction with the following description and accompanying drawings. It should be understood, however, that the following description, while indicating preferred embodiments of the present invention, is given by way of illustration and not of limitation. Many changes and modifications may be made within the scope of the present invention without departing from the spirit thereof and the invention includes all such modifications.

BRIEF DESCRIPTION OF THE DRAWINGS

A clear conception of the advantages and features of the present invention, and of the construction and operation of the typical mechanisms provided with the present invention, will become more readily apparent by referring to the exemplary and therefore non-limiting embodiments illustrated in the drawings accompanying and forming a part of this specification, and in which.

DETAILED DESCRIPTION OF THE PREFERRED EMBODIMENTS

Referring now to FIGS. 1–4C, these figures illustrate several different embodiments of known prior art vehicle assembly constructions. FIG. 1 illustrates a simple schematic of a conventional headlamp assembly 20 which includes a parabolic reflective surface 22 disposed behind a light source 24. The light emanating from the light source is reflected by the parabolic surface forwardly and at least in a rudimentary fashion directed toward a particular direction. However, as also shown in FIG. 1, the light which emanates directly from the light source and does not hit the parabolic reflective surface is directed upward or downward and not forward and therefore is wasted light. Additionally, the light emanating from the source via the reflective surface produces high intensity and low intensity regions initially generated by the light source itself and therefore the light produced by the assembly will be of an uneven nature.

FIGS. 2 and 3 illustrate two embodiments of a general light assembly 29 as described above and which may represent many different vehicle light assemblies including taillamp assemblies or portions of multiple taillamp assemblies, dome lights, map lights, storage lights, hood and trunk lights, or other vehicle lights. FIGS. 4A–C simply illustrate three of many possible embodiments of taillight assemblies including a plurality of pillow optics on an inside surface of the taillamp lens.

The present invention is directed to any one of these different vehicle light assemblies or other various configurations of vehicle light assemblies but including an improved lens cover or cover layer construction or including an improved reflective surface. The novel vehicle light assemblies constructed according to the present invention produce light having a much more even, consistent distribution intensity, having a particular shape envelope, and directed toward a particular target area thus substantially reducing or eliminating the amount of wasted light from the assemblies. By utilizing the present invention, more light produced by a light source is directed to where it is needed and therefore produces better illumination of a target area or permits use of a lower power light source to achieve the same amount of lighting and thereby reduce energy consumption and part cost.

Figure 5:
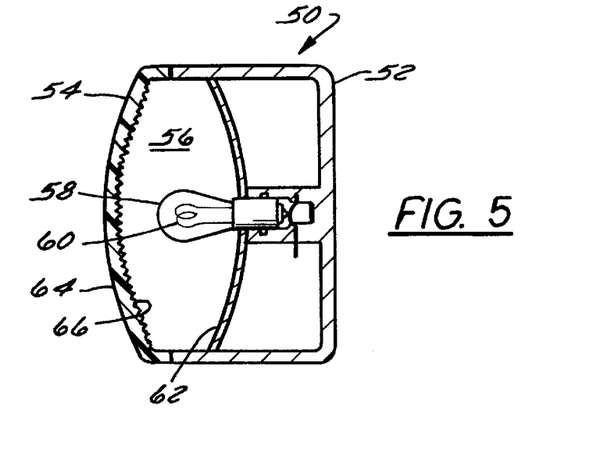
FIG. 5 illustrates one embodiment of a vehicle light assembly constructed in accordance with the present invention.

With that in mind, FIG. 5 illustrates one embodiment of a vehicle light assembly 50 which may be in the form of a typical vehicle dome light, storage compartment light, or even a conventional taillight assembly. The assembly 50 includes a housing 52 and a lens cover 54. The lens cover 54 and housing 52 define therein an interior 56 of the assembly 50. A lamp or bulb 58 which has a conventional filament 60 is disposed within the interior chamber 56 of the housing. A reflector surface 62 is disposed behind the bulb 58 within the interior 56 so that, substantially all light emanating from the bulb is projected forward toward the cover 54 and out of the assembly 50.

In the present embodiment, the cover 54 can be virtually any type of lens cover for an automotive vehicle light assembly but is illustrated having no macro-optical surface structure such as pillow, lenticular or Fresnel optics on either surface. As described in more detail below, many vehicle light assemblies include some type of large or macro-optical surface structure formed on at least one surface of the lens covers.

The macro-optical surface structures noted above are often on the order of about one-half to one inch or the like in size for large vehicle light assembles such as taillight assemblies or on the order of about $1/16^{th}$ to $1/8^{th}$ of an inch for smaller assemblies such as interior dome lights and map lights. The elements of the surface microstructure providing the novel diffusing capabilities is microscopically smaller in scale on the order of, for example, ten micrometers in size.

In this embodiment, the cover 54 is simply a transparent or semi-transparent material such as a plastic or glass which has an exterior surface 64 and a surface microstructure 66 carried on an interior surface of the cover. The microstructure 66 is preferably replicated from a surface microstructure optically recorded in a photoresist material. Such a micro structure is described in one or more of the issued patents and co-pending application note above. The methods for forming and for replicating the structures are also described in one or more of the issued patents and co-pending applications. In this embodiment, the cover 54 would typically be formed from a semi-transparent plastic material which would somewhat diffuse the light exiting the cover 54. The addition of the microstructure 66 on an inside surface of the cover 54 greatly enhances the optical characteristics of the assembly 50 by producing a homogeneous, consistent, shaped pattern of light. The microstructure is constructed and designed to direct substantially all of the light exiting the light assembly in a particular direction, shape or distribution. By controlling the direction and distribution of light emanating from the assembly 50, most of the light is directed toward its intended target whereas very little, if any of the light is directed to areas where it is not needed and therefore is not wasted.

Figure 6:
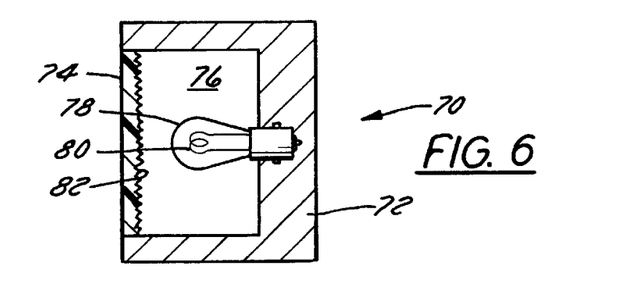
FIG. 6 illustrates one alternative embodiment of a vehicle light assembly constructed in accordance with the present invention.

FIG. 6 illustrates one alternative embodiment of a vehicle light assembly 70. This particular light assembly 70 is commonly used as a flush mount or surface light and does not typically utilize a reflector surface behind the light. The light assembly 70 includes a housing or enclosure 72 either separate from a surface into which the light is recessed or as part of the surface itself, for example, a dash panel or an interior molding surface. A lens cover 74 is disposed over an opening in the housing 72 and between them define an interior chamber 76. A bulb 78 is disposed within the interior chamber 76 and includes a standard filament 80. Light emanating from the bulb 78 exits the housing through the lens cover 74 or is absorbed by portions of the housing within the interior chamber 76. The lens cover again is typically molded from a plastic material and may be transparent or semi-transparent. The lens cover 74 of the invention also includes on an inside surface 82 a microstructure integrally formed thereon. The microstructure 82 is provided on the interior surface of the cover 74 in accordance with the methods described in the above noted issued patents and co-pending applications. The surface microstructure may be designed and molded integrally into the cover material to produce the desired optical qualities in the light exiting the assembly 70. The microstructure may further be designed to control the directionality of light exiting the cover 74 so that substantially all of the light exiting the assembly 70 is directed toward a desired target. Still further, these structures may further be desired to shape the light into a particular distribution pattern. Light assemblies as described and illustrated in FIG. 6 may be employed for dome lights, and more particularly for map lights which require that most of the light exiting the assembly be directed toward an area such as the lap of an individual seated within a vehicle.

In either of the embodiments illustrated in FIGS. 5 and 6, the microstructure 66 or 82 can also be disposed on the exterior surface of the respective covers 54 and 74 if desired. The homogenization and directionality control of light passing through the covers will be achieved regardless of whether the microstructure is molded into the interior or exterior surface of the covers.

Figure 7:
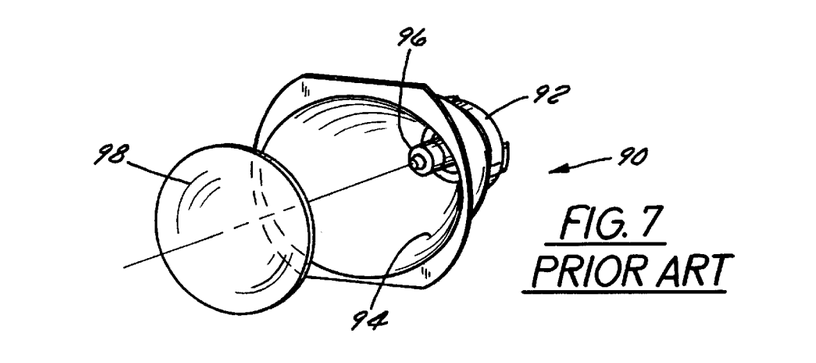
FIG. 7 illustrates a prior art headlamp assembly construction.
Figure 8:
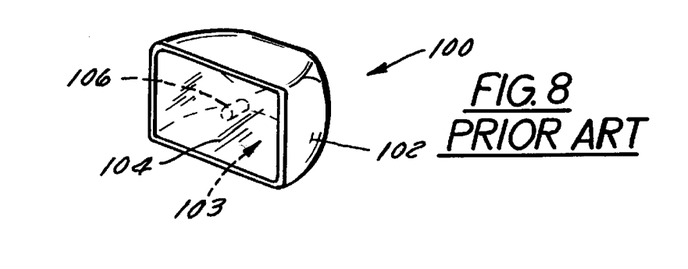
FIG. 8 illustrates an alternative prior art headlamp assembly construction.

FIGS. 7 and 8 illustrate two alternative prior art embodiments of headlight assemblies 90 and 100. The headlamp assembly 90 shown in FIG. 7 includes a housing 92 having an interior parabolic reflective surface 94 partially surrounding a bulb 96. A headlight lens cover 98 covers the remaining portion of the housing and encloses the bulb within the assembly. The bulb may be of a conventional incandescent type or of a more common halogen lamp. Regardless of the type of light source, the lens cover 98 is typically transparent and free of any surface structures. In some instances, headlamp assemblies include a plurality of pillow optics, described in more detail above and below with relation to taillamp assemblies, to enhance the aesthetic appearance of the headlamp assembly as well as the light emanating therefrom. However, these pillow optic structures do not enhance and may actually detract from the optical qualities of the headlight. Thus, the headlamp assembly 90 produces a light output similar to that shown in the schematic of FIG. 1 and also produces a lot of wasted light above, below and to the side of the direction toward which the light should be directed.

FIG. 8 illustrates another embodiment of a headlamp assembly 100 which is known in the art. The assembly includes an enclosed glass structure having an interior pressurized chamber 103 and including a portion of the enclosed housing 102 as a transparent section 104. Enclosed and sealed within the chamber 103 is a filament or light source element 106 which functions under pressure within the chamber 103. The transparent section 104 is essentially identical to the cover 98 of the previously described embodiment wherein it is essentially transparent and contains no irregularities or large surface structures thereon other than some pillow optic formations in some constructions.

Figure 9:
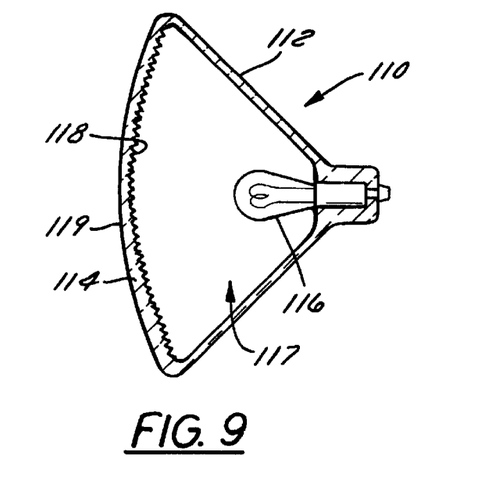
FIG. 9 illustrates one embodiment of a vehicle headlight assembly constructed in accordance with the present invention.

FIG. 9 illustrates a headlamp assembly 110 of the invention which has a housing 112 which may be of the type illustrated in either of FIGS. 7 or 8. The light assembly 110 has a generally transparent cover 114 disposed over a portion of the housing in order to permit light generated by a light source 116 to pass through the lens cover 114. The microstructure 118 is formed into the inside surface of the lens cover 114 by one of the processes disclosed in one or more of the issued patents and co-pending applications noted above and assigned to the assignee of the present invention. The microstructure 118 can alternatively be molded directly into the exterior surface 119 of the lens cover 114 as well.

The microstructure 118 can be designed and replicated into the lens cover to diffuse the light emanating from the bulb 116 in order to provide a smoothly, consistent light output pattern from the assembly 110 in a predetermined shape and direction. The headlight may be designed to provide a beam having a horizontal angular width of, for example, 10°, 20°, 30° or the like and having a vertical angular width of, for example, 5°, 10°, 15° or the like and wherein the beam can be directed in a substantially horizontal or slightly upward vertical or slightly downward vertical direction as well. By combining the microstructure 118 with the old technology of utilizing a parabolic reflective surface to partially direct the light, a highly efficient and higher performance headlight assembly is constructed according to the present invention.

The lens cover 114 can be constructed from any number of suitable materials but a conventional headlight assembly usually utilizes a glass or glass composition. One or more of the above incorporated co-pending applications disclose that the microstructure 118 can be replicated into a sol-gel glass material or may even be formed in a quartz glass or other such glass material during formation of the headlight assembly.

Figure 10:
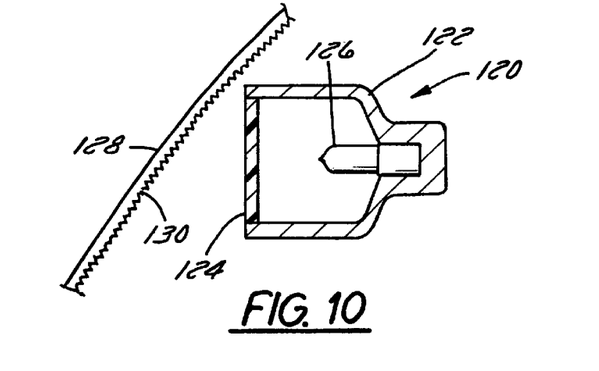
FIG. 10 illustrates one alternative embodiment of a headlight assembly for a vehicle constructed in accordance with the present inventions.

In an alternative embodiment, FIG. 10 illustrates a layered headlight construction for a typical modern automobile. A headlight assembly 120 of this construction includes a headlight subassembly 122 having an inner lens cover layer 124 of a transparent material. A bulb 126 is sealed within the subassembly 122 and cover 124 and provides light for the assembly 120. A second outer layer 128 is disposed over the headlight subassembly 122 and typically follows the contour of the vehicle sheet metal or plastic body panels in order to provide a smooth aerodynamic surface for air passing over the vehicle. The outer lens cover 128 can be provided with a microstructure 130 formed on either the inner surface of the lens cover 128 as shown or can be provided alternatively on the outer surface thereof. In this particular embodiment, the microstructure 130 can alternatively be provided on either surface of the lens cover 124 of the inner layer similar to that described for the embodiment of FIG. 9.

Figure 17A:
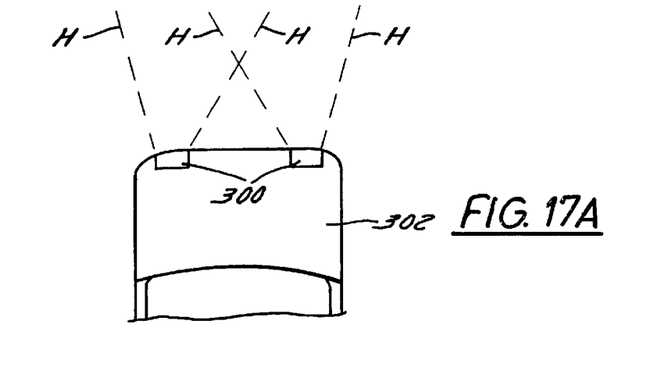
FIGS. 17A and B illustrate a top and side schematic view, respectively, of light emanating from headlights of a vehicle.
Figure 17B:
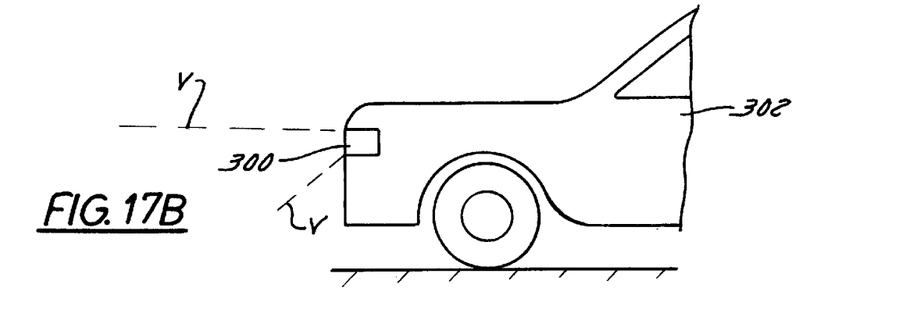

FIGS. 17A and 17B illustrate a schematic of light output from a pair of headlights 300 on a vehicle 302. The horizontal boundaries H of each headlight can be controlled according to the microstructure construction on each headlight 300. Each light can be designed to vary one or both boundaries H as desired. The vertical boundaries V can be similarly controlled and varied by design to direct the light output in a desired vertical direction. Additionally, the shape or distribution of the projected light emanating from each headlight 300 can be controlled to confrom to a particular desired pattern or shape.

Figure 11:
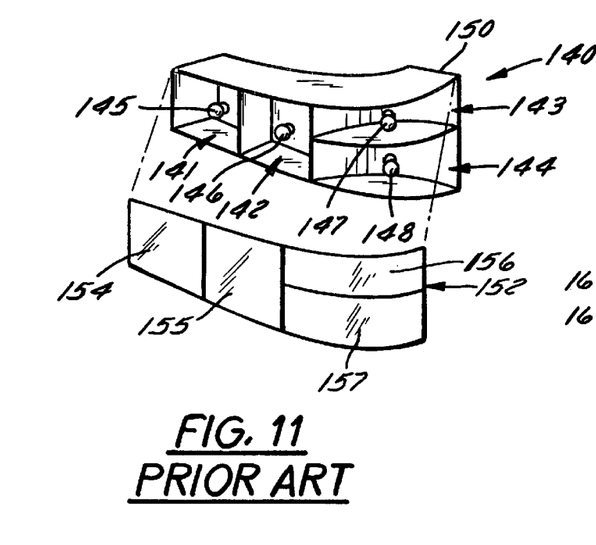
FIG. 11 illustrates a perspective view of one prior art vehicle taillamp assembly construction.

FIG. 11 illustrates a perspective view of a standard vehicle taillight assembly 140 which includes a plurality of different compartments 141, 142, 143 and 144, each having a separate bulb 145, 146, 147 and 148 dedicated to each of the compartments, respectively. Each of the compartments is provided in the taillamp assembly 140 for a dedicated purpose such as a turn signal light, a braking lamp, a night driving lamp or a hazard flasher. A housing 150, typically of a plastic molded construction, defines each of the separate compartments 141, 142, 143 and 144 therein. The housing 150 can take on any number of configurations and constructions without departing from the scope of the present invention and may indeed be only a singular housing and lamp construction as shown in the prior art drawing FIGS. 2 and 3.

The taillamp assembly 140 also includes a lens cover 152 having a plurality of discrete and generally transparent sections 154, 155, 156 and 157. Each of the cover sections is dedicated to cover one of the separate compartments and may have its own particular color of transparent material and also a different design of the pillow optics as discussed below. Again, the optics employed in conventional taillamp assemblies is rudimentary at best. Each of the compartments may include a reflective surface surrounding a portion of the bulbs to reflect most of the light from the bulb forward toward the cover assembly 152. Depending upon the color of the lens cover and the pillow optic construction, the light emanating from the taillamp assembly is typically spread in such a manner that much of the light is wasted upward or downward where it is not needed and less of the light is directed towards a desired target area such as behind a vehicle where one or more other vehicles may be positioned. Any disadvantages or flaws within the light bulbs is simply transmitted through the lens cover assembly 152 in the form of high intensity and low intensity regions as described above. In addition, many taillamp assemblies employ one or more Fresnel lenses in each of the lens cover sections 154, 155, 156 or 157 when deemed appropriate in order to provide rudimentary collimating and spreading of light emanating from each of the compartments. The Fresnel optics are typically provided on an interior surface of one or more of the lens cover assembly 152.

Figure 12:
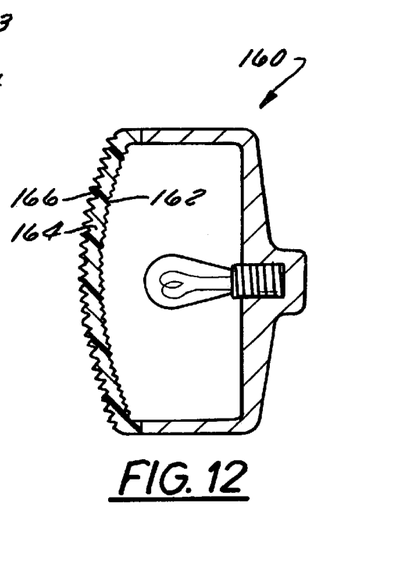
FIG. 12 illustrates one embodiment of a vehicle taillamp assembly constructed in accordance with the present invention.
Figure 13:
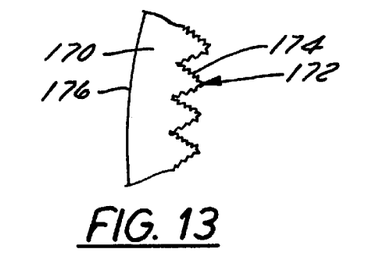
FIG. 13 illustrates a partial view of an alternative vehicle taillamp assembly constructed in accordance with the present invention.

FIG. 12 illustrates one embodiment of a tail lamp assembly constructed in accordance with the present invention. The taillamp assembly 160 is constructed generally similar to that disclosed in FIG. 11. However, the Fresnel optics 162 are shown formed on an interior surface of the lens cover 164. In this embodiment, a microstructure is integrally formed into the exterior surface of the lens cover 164. FIG. 13 illustrates another alternative embodiment for a taillamp lens cover assembly 170. The lens cover 170 includes Fresnel optic formations 172 on an interior surface of the lens cover. However, in this embodiment the surface micro structure 174 is integrally molded into each of the surfaces of the Fresnel optic formations 172. Therefore, the exterior surface 176 of the lens cover is smooth in construction.

Figure 14:
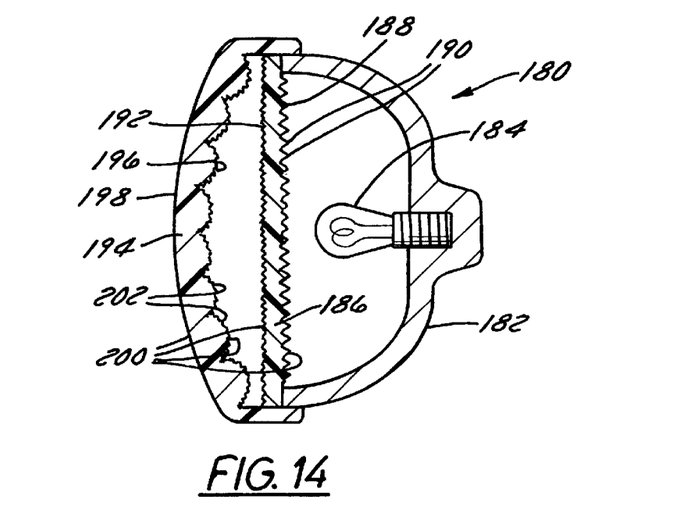
FIG. 14 illustrates another alternative embodiment of a vehicle taillamp assembly constructed in accordance with the present invention.

FIG. 14 illustrates an increasingly common taillamp assembly construction wherein the lens cover is a two-layer construction having an inner layer and an outer layer. The taillamp assembly 180 illustrated in FIG. 14 includes a housing 182 having therein a bulb 184. An inner lens cover layer 186 is disposed over an open portion of the housing. This lens cover layer 186 includes an interior layer 188 having thereon a plurality of Fresnel optic formations 190. The inner lens layer 186 also has an exterior surface 192 facing outward from the housing 182.

Disposed outward from the inner lens layer 186 is an outer lens cover layer 194 also having an interior surface 196 and an exterior surface 198. In this embodiment, a surface microstructure 200 for providing the homogenization, shaping and light directing characteristics is integrally molded into the outer surface 192 of the inner lens cover 186. A plurality of pillow optic formations 202 are provided on the inner surface of the exterior lens cover 194 for further enhancing the aesthetic appearance of the taillamp assembly 180. In alternative embodiments, the microstructure 200 may be integrally molded into the exterior surface 198 of the outer lens cover 194, directly into the surfaces of the pillow optic formations 202, or directly into the surface of the Fresnel optical structures 190 as desired.

Figure 15:
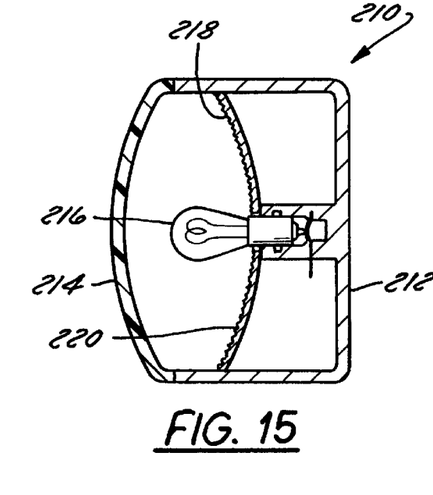
FIG. 15 illustrates another alternative embodiment of a vehicle light assembly in the form of a reflective light assembly constructed in accordance with the present invention.
Figure 16A:
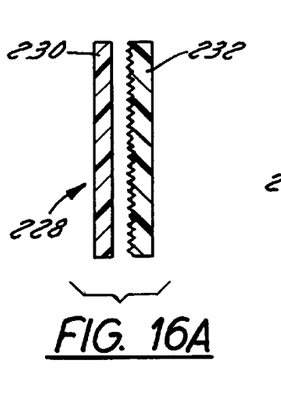
FIGS. 16A and 16B illustrate other embodiments of a reflective vehicle light assembly constructed in accordance with the present invention.
Figure 16B:
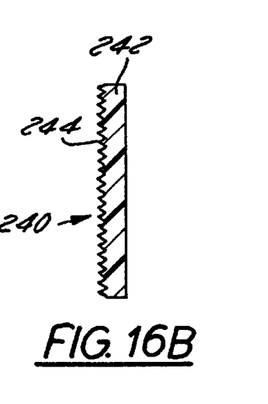

FIGS. 15, 16A and 16B illustrate two alternative reflector light assembly embodiments of the present invention. FIG. 15 illustrates a vehicle light assembly 210 having a housing 212, a lens cover 214 and a light source 216 disposed within the housing and lens cover. In this embodiment, a reflective surface 218 is disposed behind and partially surrounding the light source 216 for reflecting most or all of the light emanating form the source out of the assembly 210 through the cover 214. In this embodiment, the reflective surface 218 includes a surface microstructure 220 formed in the surface facing the lens cover 214. Light emanating from the source and reflected by the reflective surface 218 is homogenized, directionally controlled and shaped according to the particular characteristics of the microstructure 220.

In this embodiment, the microstructure 220 can be replicated either from an optically created submaster and molded into the reflective surface during its fabrication or from a mechanically created submaster and then molded into the reflective surface. Alternatively, the microstructure can be mechanically created directly on the reflective surface 218 via one of several methods disclosed in one or more of the above noted pending patent applications assigned to the assignee of the present invention. Such methods include but are not limited to brushing, etching or bead blasting the surface during fabrication of the reflective surface 218.

FIGS. 16A and 16B illustrate a simple cross-sectional view of two alternative embodiments of vehicle reflector assemblies which utilize only extrinsic or ambient light in order to function properly. In FIG. 16A, a reflector assembly 228 has a molded reflective lens cover 230 which can take on any number of configurations and constructions in order to provide appropriate light reflection characteristics. Reflective surfaces typically include internal metallic honeycombs insert molded into the lens cover 230, though not shown in this embodiment, or some other type of shape molded into the lens cover 230. Such internal shapes may be molded from separate materials and embedded into the lens cover 230 or molded integrally from the lens cover material itself.

In this embodiment however, a separate reflective backing surface 232 is provided on a rear surface of the lens cover 230 which provides the reflective characteristics of the assembly. Light emanating toward the reflector and incident thereon is reflected back through the lens cover 230 by the reflective element 232. The surface of the reflective backing surface 232 facing the lens cover 230 is provided with an integral microstructure 234 produced thereon just as the microstructure 220 described above for the reflective surface 218. The microstructure 234 provides the homogenizing, directional control and light shaping characteristics or properties for the reflector assembly 228.

FIG. 16B illustrates an alternative embodiment of a reflector assembly 240 which eliminates the separate reflective surface 232 from the prior embodiment. In this embodiment, the reflective qualities and characteristics are provided internally in a lens cover 242 either integral from the lens material or insert molded into the lens material. However in this embodiment, a microstructure 244 is formed on the exterior surface of the lens cover 242 and provides the homogenizing, directional control and light shaping properties for any light reflected back from within the lens cover 242.

Figure 18A:
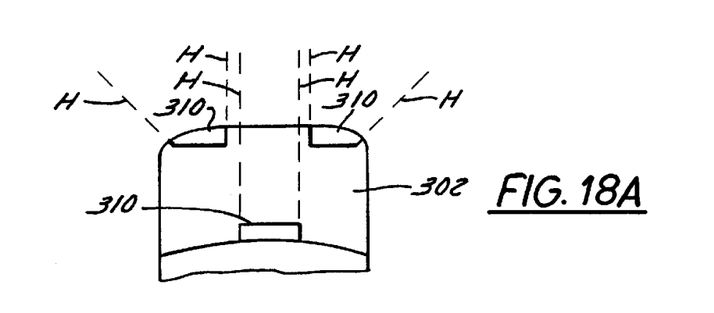
FIGS. 18A and B illustrate top and side schematic views of light emanating from taillights of a vehicle.
Figure 18B:
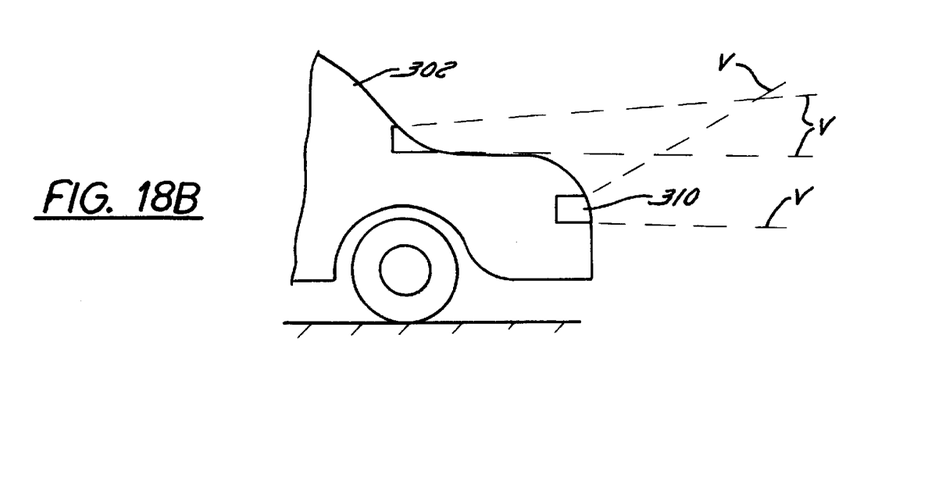

FIGS. 18A and 18B illustrate a schematic of light output from a pair of taillights 310 on a vehicle 302. The horizontal boundaries H of each taillight can be controlled according to the microstructure construction on each taillight 310. Each light can be designed to vary one or both boundaries H as desired. The vertical boundaries V can be similarly controlled and varied by design to direct the light output in a desired vertical direction. Additionally, the shape or distribution of the projected light emanating from each taillight 310 can be controlled to conform to a particular desired pattern or shape.

The particular construction and configuration of a reflector for a vehicle is not intended to limit the scope of the present invention. The invention is directed to providing a homogenizing, shaping and light directing microstructure on a surface of a light assembly for a vehicle whether the light assembly be of the type having its own light source or whether it be of a reflective type. Further, the invention is not to be limited to whether the surface microstructure is provided on one of the transparent lens covers of the assembly or on one of the reflective surface. With that in mind, the previously described headlight, taillamp, and other vehicle light assemblies may also include thereon a surface microstructure provided on the reflective surface of the assembly instead of on of the transparent lens covers of the assemblies.

The present invention is not to be limited by a particular vehicle light assembly construction nor is it to be limited only to the disclosed embodiments as described above. A vehicle light assembly may be provided having any number of configurations and constructions but includes the inventive microstructure on a surface thereof for greatly enhancing the optical characteristics of the light.

The present invention significantly enhances the optical qualities of vehicle light assemblies. Light wasted by prior constructions is redirected toward an intended target by the present invention. The light is also shaped in order to correspond to a particular target shape or configuration. The light is also smoothed or evened out to eliminate dangerous or annoying high and low intensity regions in the light output. Thus, the invention results in brighter and smoother light output directed toward an intended target. Light assembly efficiency is improved, glare is reduced, less energy is required to produce the same light intensity as prior light assemblies, and smaller brighter light assemblies are possible.

Though the invention has been described referring to particular embodiments, many other changes and modifications may be made to the invention as described without departing from the spirit and scope thereof. The scope and spirit of these changes will become apparent from the appended claims. The scope of the invention is therefore intended only to be limited by the appended claims.

What is claimed is:

1. A vehicle light assembly comprising:
   a light source;
   an at least partially transparent lens cover disposed over a portion of the light source, wherein the lens cover has an inner surface adjacent the light source and an exterior surface;
   a plurality of at least partially transparent pillow optic formations on the inner surface of the lens cover; and
   a light-shaping microstructure on the exterior surface of the lens cover, wherein the microstructure homogenizes, shapes and directs light from the light source through the cover, thereby to provide a smooth, homogeneous and continuous pattern of light in a predetermined shape distribution and direction.

2. The vehicle light assembly according to claim 1, wherein the cover is molded from a plastic material having the microstructure integrally molded therein.

3. The vehicle light assembly according to claim 1, wherein the microstructure is formed integral in the inner surface of the cover during formation of the cover.

4. The vehicle light assembly according to claim 1, wherein the vehicle light assembly is a headlamp assembly.

5. The vehicle light assembly according to claim 1, wherein the vehicle light assembly is an interior light for use in a passenger compartment of a vehicle.

6. The vehicle light assembly according to claim 5, wherein the interior light is a light selected from the group comprising a vanity mirror light, a map light, a dome light, a storage compartment light, an under dash light and a side illumination light.

7. The vehicle light assembly according to claim 1, further comprising:
   a plurality of Fresnel optics on the inner surface of the cover.

8. The vehicle light assembly according to claim 1, wherein the light source is selected from the group comprising an engine compartment light and a trunk storage compartment light.

9. A vehicle headlamp assembly comprising:
   a housing
   a light source held within the housing;
   an at least partially transparent cover disposed over a portion of the housing, wherein the cover has an inner cover surface and an exterior cover surface; and
   a light shaping surface microstructure on at least one of the inner cover surface and the exterior cover surface, wherein the microstructure homogenizes, shapes and directs light passing from the light source through the cover to provide a homogeneous, smooth, continuous pattern of light in a predetermined shape distribution and directionality to the exterior of the vehicle.

10. The headlamp assembly according to claim 9, wherein the microstructure is integral in an inner surface of the cover during formation of the cover.

11. The headlamp assembly according to claim 9, wherein the cover is formed from a sol-gel material and the microstructure is integral in the sol-gel material in the inner surface and formed during formation of the cover.

12. The headlamp assembly according to claim 9, further comprising:
   an enclosed glass element containing the light source and having a transparent section, and wherein the microstructure is formed in the inner surface of the cover, and wherein the inner surface of the cover is dispersed adjacent the transparent section of the glass element.

13. The headlamp assembly according to claim 12, wherein the cover is removably positioned adjacent the housing and glass element and is made from a sol-gel material.

14. The headlamp assembly according to claim 9, further comprising:
an enclosed glass element containing the light source and wherein the cover is integral as a portion of the glass element, and wherein the microstructure is carried in the inner surface of the cover.

15. The headlamp assembly according to claim 9, further comprising a curved reflective surface disposed behind the light source within the housing for reflecting at least a portion of light emanating from the light source back toward and through the cover.

16. The headlamp assembly according to claim 15, wherein the microstructure is provided in a surface of the reflective surface facing the cover.

17. A vehicle tail light assembly comprising:
a housing;
a light source within the housing;
an at least partially transparent cover disposed over a portion of the housing; and
a light shaping surface microstructure carried in a surface of the taillight assembly that both homogenizes and directs light passing from the light source through the cover to provide a smooth, consistent pattern of light in a predetermined distribution shape and direction.

18. The vehicle tail light assembly according to claim 17, wherein the microstructure is carried in a surface of the cover of the taillight assembly.

19. The vehicle tail light assembly according to claim 17, further comprising a reflective surface within the housing disposed behind the light source, and wherein the microstructure is carried in the reflective surface.

20. The vehicle tail light assembly according to claim 17, wherein the cover further comprises;
a first cover layer disposed over the housing;
a second cover layer disposed over the first cover layer; and
wherein the microstructure is disposed in a surface of one of the first and the second cover layers.

21. A vehicle tail light assembly for a vehicle, the tail light assembly comprising:
a housing;
a lens cover carried by the housing;
a light source disposed within the housing;
a reflective surface disposed within the housing behind and at least partly surrounding the light source, for reflecting light from the light source through the lens cover; and
a light-shaping microstructure formed in the reflective surface, wherein the microstructure homogenizes, shapes and directs light from the light source through the lens cover, thereby to provide a smooth, homogeneous and continuous pattern of light in a predetermined shape distribution and directionality to the exterior of the vehicle.

22. A vehicle light assembly comprising:
a housing having an open portion;
a light source disposed within the housing;
a lens cover characterized as including an inner lens cover layer disposed over the open portion of the housing and an outer lens cover layer disposed outward from the inner lens cover layer, wherein the inner lens cover layer includes an interior surface and an exterior surface facing outward from the housing, and wherein the outer lens cover layer includes an interior surface and an exterior surface;
a plurality of Fresnel optic formations formed on the interior surface of the inner lens cover layer; and
a plurality of light-shaping microstructures carried by at least a portion of at least one of the inner lens cover layer and the outer lens cover layer, wherein the microstructures homogenize, shape and direct light from the light source through the lens cover, thereby to provide a smooth, homogeneous and continuous pattern of light in a predetermined shape distribution and directionality.

23. The vehicle light assembly according to claim 22, further characterized as including a plurality of pillow optic formations formed on the outer lens cover layer, wherein the microstructures are formed in the exterior surface of the outer cover layer.

24. The vehicle light assembly of claim 22, further characterized as including a plurality of pillow optic formations formed on the outer lens cover layer, wherein the microstructures are formed on the pillow optic formations.

25. The vehicle light assembly of claim 22, further characterized as including a plurality of pillow optic formations formed on the outer lens cover layer, wherein the microstructures are formed on the Fresnel optic formations.

26. A vehicle light assembly comprising:
a light source;
an at least partially transparent lens cover disposed over a portion of the light source, wherein the lens cover has an inner surface adjacent the light source and an exterior surface;
a plurality of at least partially transparent pillow optic formations on the inner surface of the lens cover, wherein each pillow optic formation has a surface; and
a light-shaping microstructure on at least one of the pillow optic formation surfaces, wherein the microstructure homogenizes, shapes and directs light from the light source through the lens cover and the pillow optic formation, thereby to provide a smooth, homogeneous and continuous pattern of light in a predetermined shape distribution and direction.

27. The vehicle light assembly of claim 26, wherein the vehicle light assembly is characterized as a tail light assembly.

28. The vehicle light assembly of claim 26, further characterized as including a plurality of at least partially transparent Fresnel optic formations on the inner surface of the lens cover.

29. The vehicle light assembly of claim 26, wherein a portion of the lens cover is formed from a sol-gel glass material, and wherein the microstructure is formed integral in a surface of the sol-gel glass material.

30. A vehicle light assembly comprising:
a light source;
an at least partially transparent lens cover disposed over a portion of the light source, wherein the lens cover has an inner surface adjacent the light source and an exterior
a first layer of material including thereon the exterior surface of the lens cover and having an inside surface;
a second layer of material including thereon the inner surface of the lens cover and having an outside surface that faces the inside surface of the first layer; and a light-shaping microstructure carried by at least a portion of at least one of the first layer of material and the second layer of material, wherein the microstructure homogenizes, shapes and directs light from the light source through the lens cover, thereby to provide a homogeneous, smooth and continuous pattern of light in a predetermined shape distribution and direction.

31. The vehicle light assembly of 30, wherein the lens cover is characterized as molded from a plastic material having the microstructure integrally formed therein.

32. The vehicle light assembly of 30, wherein the microstructure is characterized as formed integral with the cover during formation of the cover.

33. The vehicle light assembly of 30, wherein the vehicle light assembly is characterized as a tail light assembly.

34. The vehicle light assembly of 30, further characterized as including:

a plurality of at least partially transparent pillow optic formations on the inside surface of the first layer, wherein each pillow optic formation has a surface, and wherein the microstructure is formed on one of the pillow optic formation surfaces.

35. The vehicle light assembly of 30, further characterized as including:

a plurality of at least partially transparent pillow optic formations on the inside surface of the first layer, wherein the microstructure is formed in the outside surface of the second layer.

36. The vehicle light assembly of 30, further characterized as including:

a plurality of at least partially transparent pillow optic formations on the outside surface of the second layer, wherein each pillow optic formation has a surface, and wherein the microstructure is formed in a surface of each of the pillow optic structures on the outside surface of the second layer.

37. The vehicle light assembly of 30, further characterized as including:

a plurality of at least partially transparent pillow optic formations on the outside surface of the second layer, wherein the microstructure is formed in the inside surface of the first layer.

38. The vehicle light assembly of 30, further including a plurality of at least partially transparent Fresnel optic formations on the inner surface of the lens cover.

39. The vehicle light assembly of 30, wherein a portion of the lens cover is formed from a sol-gel glass material, and wherein the microstructure is formed integral in a surface of the sol-gel glass material.

* * * * *